(12) United States Patent
DeLuca et al.

(10) Patent No.: US 9,510,187 B2
(45) Date of Patent: *Nov. 29, 2016

(54) SYSTEM AND METHOD FOR RECEIVING AND TRANSFERRING A TELEPHONE DIRECTORY FROM ONE CELLULAR TELEPHONE TO THE SAME OR ANOTHER

(71) Applicants: Peter DeLuca, Melville, NY (US); George Likourezos, St. James, NY (US)

(72) Inventors: Peter DeLuca, Melville, NY (US); George Likourezos, St. James, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/281,039

(22) Filed: May 19, 2014

(65) Prior Publication Data
US 2014/0295810 A1    Oct. 2, 2014

Related U.S. Application Data

(63) Continuation of application No. 14/019,942, filed on Sep. 6, 2013, now Pat. No. 8,731,518, which is a continuation of application No. 13/231,527, filed on Sep. 13, 2011, now Pat. No. 8,532,613, which is a (Continued)

(51) Int. Cl.
*H04W 4/00* (2009.01)
*H04W 8/20* (2009.01)
(Continued)

(52) U.S. Cl.
CPC ........... *H04W 8/20* (2013.01); *H04L 67/06* (2013.01); *H04L 67/1095* (2013.01); *H04M 1/274516* (2013.01); *H04W 4/16* (2013.01); *H04M 1/72519* (2013.01)

(58) Field of Classification Search
CPC ............ H04M 1/575; H04M 1/0266; H04M 1/72527; H04M 2250/60; H04M 1/72519; H04M 3/42; H04W 4/02; H04W 68/00; H04W 88/06; H04W 4/12; H04W 92/10; H04L 67/289; H04L 29/08108; H04L 2209/60; H04L 9/082

USPC ......... 455/414.1, 406, 412.1, 415, 566, 418, 455/414.4; 709/206, 226; 715/259; 370/368, 371, 363, 374, 383
See application file for complete search history.

(56) References Cited

U.S. PATENT DOCUMENTS 4,130,738 A    12/1978 Sandstedt
5,097,502 A    3/1992 Suzuki et al.
(Continued)

FOREIGN PATENT DOCUMENTS

DE    10009844 A1    7/2001
GB    2358556 A    7/2001
(Continued)

OTHER PUBLICATIONS

Weinberg, "How to Change What a Key is on a Qwerty Keyboard in Microsoft on a Dell",www.ehow.com/print/how.sub.—7492135.sub.—change-qwerty-keyboard-microsf- t-dell.html, Feb. 14, 2011.

(Continued)

*Primary Examiner* — Nimesh Patel
(74) *Attorney, Agent, or Firm* — Carter, DeLuca, Farrell & Schmidt, LLP

(57) ABSTRACT

A cellular telephone, system and method are provided which are capable of transferring a portion of or an entire telephone directory consisting of a plurality of telephone numbers to another cellular telephone via a remote central station. The remote central station receives the telephone directory and stores the same in memory for either temporary or permanent storage. The telephone directory can then be transferred from the remote central station to the same or another cellular telephone for storing the telephone directory within a memory of the cellular telephone. An individual, a company, or other entity, utilizing the remote central station, in order to store and transfer a telephone directory from a cellular telephone to the same cellular telephone or to at least another cellular telephone, pays a fee to at least one operator of the remote central station for providing and/or performing the receiving, storing and transferring services.

3 Claims, 4 Drawing Sheets

Related U.S. Application Data continuation of application No. 10/635,955, filed on Aug. 7, 2003, now Pat. No. 8,023,925.

(60) Provisional application No. 60/401,819, filed on Aug. 7, 2002.

(51) Int. Cl.
*H04M 1/2745* (2006.01)
*H04L 29/08* (2006.01)
*H04W 4/16* (2009.01)
*H04M 1/725* (2006.01)

(56) References Cited

U.S. PATENT DOCUMENTS

| | | | |
|---|---|---|---|
| 5,276,729 A | | 1/1994 | Higuchi et al. |
| 5,572,110 A | * | 11/1996 | Dunstan ................ 320/106 |
| 5,930,703 A | | 7/1999 | Cairns |
| 6,246,871 B1 | | 6/2001 | Ala-Laurila |
| 6,625,445 B1 | | 9/2003 | Ishigami |
| 6,813,498 B1 | * | 11/2004 | Durga et al. ............. 455/456.1 |
| 6,873,841 B1 | | 3/2005 | Sagar |
| 6,975,854 B1 | | 12/2005 | Kee |
| 7,003,327 B1 | | 2/2006 | Payne et al. |
| 8,023,925 B2 | * | 9/2011 | DeLuca et al. ............. 455/406 |
| 8,532,613 B2 | * | 9/2013 | DeLuca et al. ............. 455/406 |
| 8,731,518 B2 | * | 5/2014 | DeLuca et al. ............. 455/406 |
| 2001/0018340 A1 | * | 8/2001 | Tagi ................ H04M 3/42348 455/414.1 |
| 2001/0027414 A1 | * | 10/2001 | Azuma ................ G06Q 30/02 705/14.64 |
| 2002/0018547 A1 | | 2/2002 | Takae et al. |
| 2002/0019225 A1 | | 2/2002 | Miyashita |
| 2002/0094806 A1 | | 7/2002 | Kamimura |
| 2002/0136380 A1 | * | 9/2002 | Aoyama ................ 379/201.01 |
| 2002/0156895 A1 | | 10/2002 | Brown |
| 2003/0039347 A1 | | 2/2003 | Katou |
| 2004/0203579 A1 | | 10/2004 | Comp |
| 2004/0236792 A1 | | 11/2004 | Celik |
| 2005/0253554 A1 | * | 11/2005 | DiFazio et al. ............. 320/114 |

FOREIGN PATENT DOCUMENTS

| | | |
|---|---|---|
| JP | 09294158 | 11/1997 |
| WO | 0144911 A2 | 6/2001 |

OTHER PUBLICATIONS

PCT International Search Report for PCT/US03/24910, Jul. 8, 2003.

Ginn, "Serial Download of Phone Nos. for Hand Phone", Motorola Tech Devs., Motorola Inc, vol. 32, pp. 122-123 (1997), XP000741156, Sep. 1997.

* cited by examiner

SYSTEM AND METHOD FOR RECEIVING AND TRANSFERRING A TELEPHONE DIRECTORY FROM ONE CELLULAR TELEPHONE TO THE SAME OR ANOTHER

PRIORITY

The application claims priority to a United States patent application filed on Sep. 6, 2013 and assigned U.S. patent application Ser. No. 14/019,942, now U.S. Pat. No. 8,731,518, which claims priority to a United States patent application filed on Sep. 13, 2011 and assigned U.S. patent application Ser. No. 13/231,527, now U.S. Pat. No. 8,532,613, which claims priority to a United States patent application filed on Aug. 7, 2003 and assigned U.S. patent application Ser. No. 10/635,955, now U.S. Pat. No. 8,023,925, which claims priority to a United States Provisional Application filed on Aug. 7, 2002 and assigned U.S. Provisional Application Ser. No. 60/401,819, the entire contents of which are incorporated herein by reference.

BACKGROUND OF THE INVENTION

1. Field of the Invention

This invention relates to the field of mobile telephony, and more particularly, to a system and method for receiving and transferring a telephone directory or a portion thereof from one cellular or mobile telephone to the same or another.

2. Description of the Related Art

Cellular or mobile telephones, including cellular or mobile radiotelephones having radio features, are provided with the ability to store a telephone directory having a large amount of telephone numbers. A user typically programs or stores a telephone directory within a memory of the cellular telephone by using a keypad of the telephone to input the telephone numbers of the telephone directory one-by-one and by pressing a key after inputting each number to signal the telephone to store the telephone number. The memory is generally a built-in random access memory (RAM), such as a RAM module of a central processing unit. The memory could also be a removable memory card as known in the art.

The task of inputting each telephone number of the telephone directory is time consuming and tedious. Nonetheless, such a telephone directory allows the user to program in a predetermined number of telephone numbers and names (and/or other identifiers) associated with the telephone numbers. Accordingly, the user can program frequently used telephone numbers into the phone and retrieve a desired number using an associated name or other identifier, thereby eliminating the need to remember a particular number or to push several keys on the keypad. Once retrieved, the cellular telephone can automatically dial the number.

The task of inputting each telephone number often needs to be repeated whenever the cellular telephone user acquires another permanent or temporary cellular telephone; whenever a company or other entity hires a new employee and desires for the new employee to have a particular telephone directory, e.g., a telephone directory listing the telephone numbers of various vendors or employees, stored in his cellular telephone; whenever a cellular telephone user desires to have a portion of or the entire telephone directory of another telephone stored in his telephone; etc.

It is envisioned therefore to enable a cellular telephone user to be able to transfer the telephone directory or a portion thereof from one cellular telephone to another cellular telephone via a remote central station without having to individually input each telephone number of the telephone directory all over again. It is also envisioned to enable a cellular telephone user to be able to store his telephone directory or a portion thereof at the remote central station as a permanent or temporary backup. The user can then retrieve from the remote central station his telephone directory or a portion thereof and store the telephone directory or the portion thereof in his cellular telephone, if the telephone directory stored in his telephone is inadvertently deleted. The telephone directory or the portion thereof can also be retrieved and stored in another cellular telephone.

This is crucial since many cellular telephones have the capacity to program up to 100, and even as many as 250, telephone numbers. Furthermore, the telephone keypad is typically limited to fewer keys than there are letters so that a single key is used to input multiple letters. Furthermore, the display on most telephones has only one or a few lines and may not provide enough characters to simultaneously display both a complete name and number. For these reasons, programming a large number of telephone numbers can be difficult and time consuming, and frustrating when the telephone directory already exists in digital form within another cellular telephone.

Accordingly, there exists a need in the art for a cellular or mobile telephone with the ability to transfer a telephone directory or a portion thereof stored therein to another cellular telephone via a remote central station, such that the transferred telephone directory or the portion thereof does not have to be typed. Prior disclosures have not provided a design for a cellular telephone capable of transferring a telephone directory or a portion thereof stored therein to another cellular telephone via a remote central station. Further, prior disclosures have not provided a design for a telephone directory management system capable of receiving at a remote central station a telephone directory or a portion thereof stored within a cellular telephone, storing the telephone directory or the portion thereof at the remote central station for temporary and permanent backup, and transferring or transmitting the same from the remote central station to the same cellular telephone or to another cellular telephone for storage therein.

Further still, prior disclosures have not provided a method for operating a remote central station capable of receiving, storing and transferring a telephone directory or a portion thereof from a cellular telephone to the same cellular telephone or to at least another cellular telephone where the operator of the remote central station is paid a fee for providing and/or performing the storing and transferring services.

SUMMARY OF THE INVENTION

It is an aspect of the present invention to provide a cellular telephone that can transfer a telephone directory or a portion thereof consisting of a plurality of telephone numbers to another cellular telephone via a remote central station, thereby foregoing the need to type the telephone directory.

It is also an aspect of the present invention to provide a telephone directory management system capable of receiving at a remote central station a telephone directory or a portion thereof stored within a cellular telephone, storing the telephone directory or the portion thereof at the remote central station for temporary and permanent backup, and transferring or transmitting the same from the remote central station to the same cellular telephone or to another cellular telephone for storage therein.

Also, it is an aspect of the present invention to provide a method for operating a remote central station capable of receiving, storing and transferring a telephone directory or a portion thereof from a cellular telephone to the same cellular telephone or to at least another cellular telephone. The method provides the operator of the remote central station to be paid a fee for providing and/or performing the storing and transferring services.

The cellular or mobile telephone, system and method of the present invention are capable of transferring a telephone directory or a portion thereof consisting of a plurality of telephone numbers to another cellular telephone via a remote central station, thereby foregoing the need to type the telephone directory. The cellular telephone is programmed with a set of instructions (e.g., application software) capable of being executed by a processor for transferring the telephone directory or the portion thereof to the remote central station. The remote central station preferably includes at least one computing device capable of being wirelessly accessed by the cellular telephone, such as a base station and a server.

The remote central station of the inventive system receives the telephone directory or the portion thereof and stores the same in memory for either temporary or permanent storage. The telephone directory or the portion thereof can then be transferred or transmitted from the remote central station to another cellular telephone for storing the same within a memory of the cellular telephone upon receiving instructions or automatically on a periodic basis; the telephone directory is then accessible by a user of the cellular telephone for locating a particular telephone number and dialing the same to complete a cellular telephone call. The remote central station is programmed with a set of instructions (e.g., application software) capable of being executed by at least one processor for performing the functions of the remote central station. The remote central station preferably includes at least one computing device capable of being wirelessly accessed by the cellular telephone, such as a base station and a server.

It is contemplated that the telephone directory or the portion thereof (i.e., the same portion transmitted to the remote central station or a different portion) can also be transmitted from the remote central station to the same cellular telephone from which the telephone directory was originally transmitted to the remote central station, in case the telephone directory stored within the cellular telephone is inadvertently deleted or its integrity is affected.

It is also contemplated to store an updated telephone directory within the cellular telephone of the present invention and transmit the updated telephone directory from the cellular telephone to the remote central station for storage therein. The updated telephone directory can then be either automatically or manually transmitted to a plurality of cellular telephones of the present invention which correspond to individuals authorized to obtain the updated telephone directory, e.g., employees of a company.

If the updated telephone directory is automatically transmitted, the remote central station automatically broadcasts the updated telephone directory to at least a subset of the plurality of cellular telephones. Preferably, the remote central station receives instructions from one of the cellular telephones before broadcasting the updated telephone director to at least the subset of the plurality of cellular telephones. If the updated telephone directory is manually transmitted, the remote central station awaits a signal generated and transmitted from a cellular telephone of the subset of the plurality of cellular telephones before transmitting the updated telephone directory to the cellular telephone.

The signal preferably includes an identification code or password for identifying the cellular telephone as belonging to the subset of the plurality of cellular telephones. The signal can also identify a portion of the updated telephone directory that the subscriber desires. The same process is performed for all of the plurality of cellular telephones belonging to the subset for receiving the updated telephone directory. In the case of manual transmission, the remote central station is programmed to send an alphanumeric or audible message to each of the plurality of cellular telephones belonging to the subset where the message indicates that an updated telephone directory is available for transmission from the remote central station and storage within the subset of the plurality of cellular telephones.

The remote central station can be instructed by users via at least one network, such as the Internet, or via a user's cellular telephone, of the plurality of cellular telephones belonging to the subset to transmit the updated telephone directory or a portion thereof to a computing device, such as a personal computer, via the network. The users can then elect to edit the updated telephone directory (e.g., delete telephone directory data corresponding to individuals the user of the cellular telephone would probably never need to call), before transferring the updated telephone directory from the computing device to their cellular telephones, as disclosed in U.S. Pat. No. 5,930,703 issued to Cairns on Jul. 27, 1999 and assigned to Ericsson, Inc., the contents of which are incorporated herein by reference.

It is contemplated that each of the plurality of cellular telephones belonging to the subset upon receiving the updated telephone directory append the stored telephone directory with the updated telephone directory and do not overwrite the stored telephone directory with the updated telephone directory.

An individual, a company, or other entity, utilizing the remote central station, in order to store and transfer a telephone directory from a cellular telephone to the same cellular telephone, to another cellular telephone, or to a plurality of cellular telephones, pays a fee to at least one operator of the remote central station for providing and/or performing the receiving, storing and transferring services. The fee can be periodically deducted by the remote central station from a payment account corresponding to the individual, company, or other entity.

Further features and aspects of the present invention will become more readily apparent to those skilled in the art from the following detailed description taken in conjunction with the drawings.

BRIEF DESCRIPTION OF THE DRAWINGS

Various embodiments of the present invention will be described herein below with reference to the drawings wherein:

FIG. 3b illustrates a block diagram of the cellular telephone shown by FIG. 3a.

DETAILED DESCRIPTION OF PREFERRED EMBODIMENTS

The present invention provides a cellular or mobile telephone (or radiotelephone for having radio features, such as walkie-talkie capabilities), system and method for transferring a telephone directory or a portion thereof from the cellular telephone to another cellular telephone. The system is also capable of storing the telephone directory or the portion thereof as a temporary or permanent backup and transmitting the same to the cellular telephone, if the telephone directory stored within the cellular telephone is inadvertently deleted or its integrity is affected.

Figure 1:
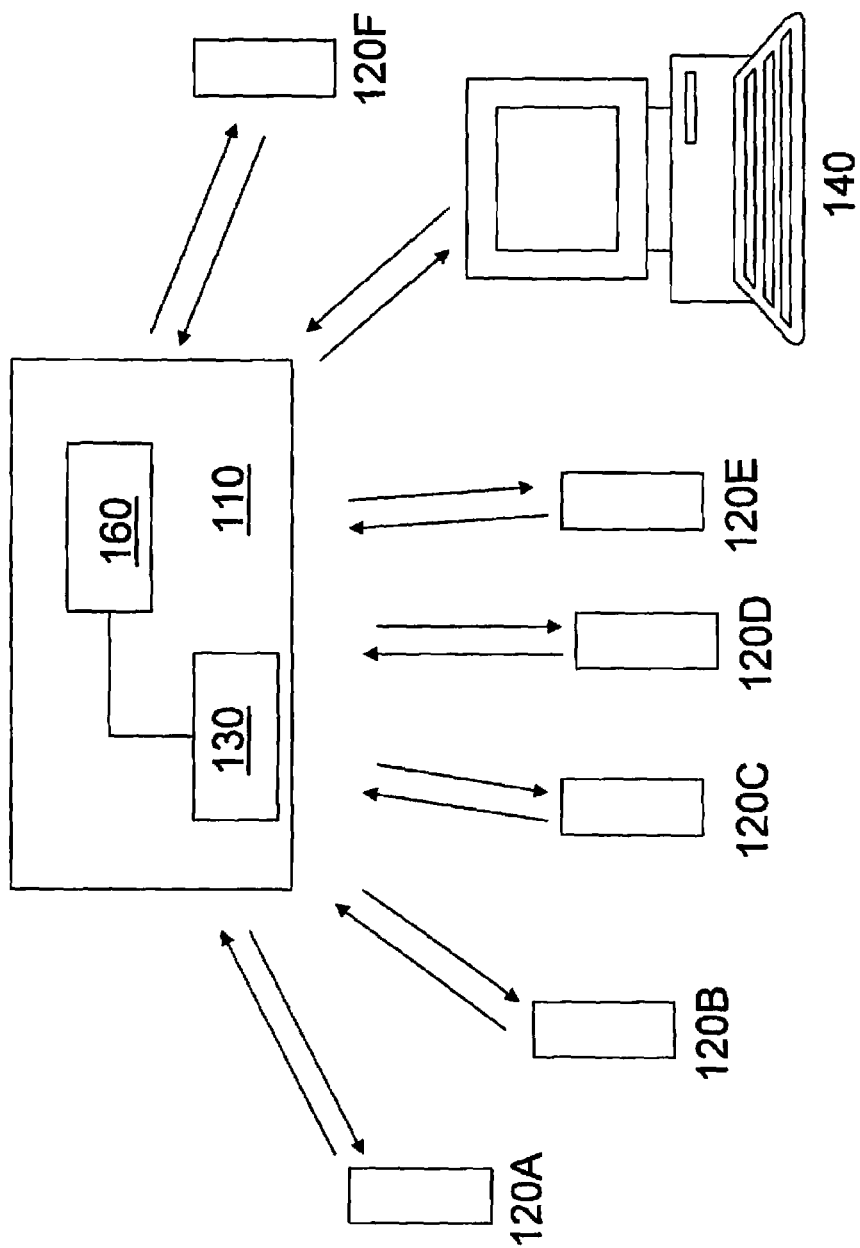
FIG. 1 is a block diagram of an exemplary system for transferring a telephone directory or a portion thereof from a cellular telephone to the same cellular telephone or to at least another cellular telephone in accordance with the present invention.
Figure 2:
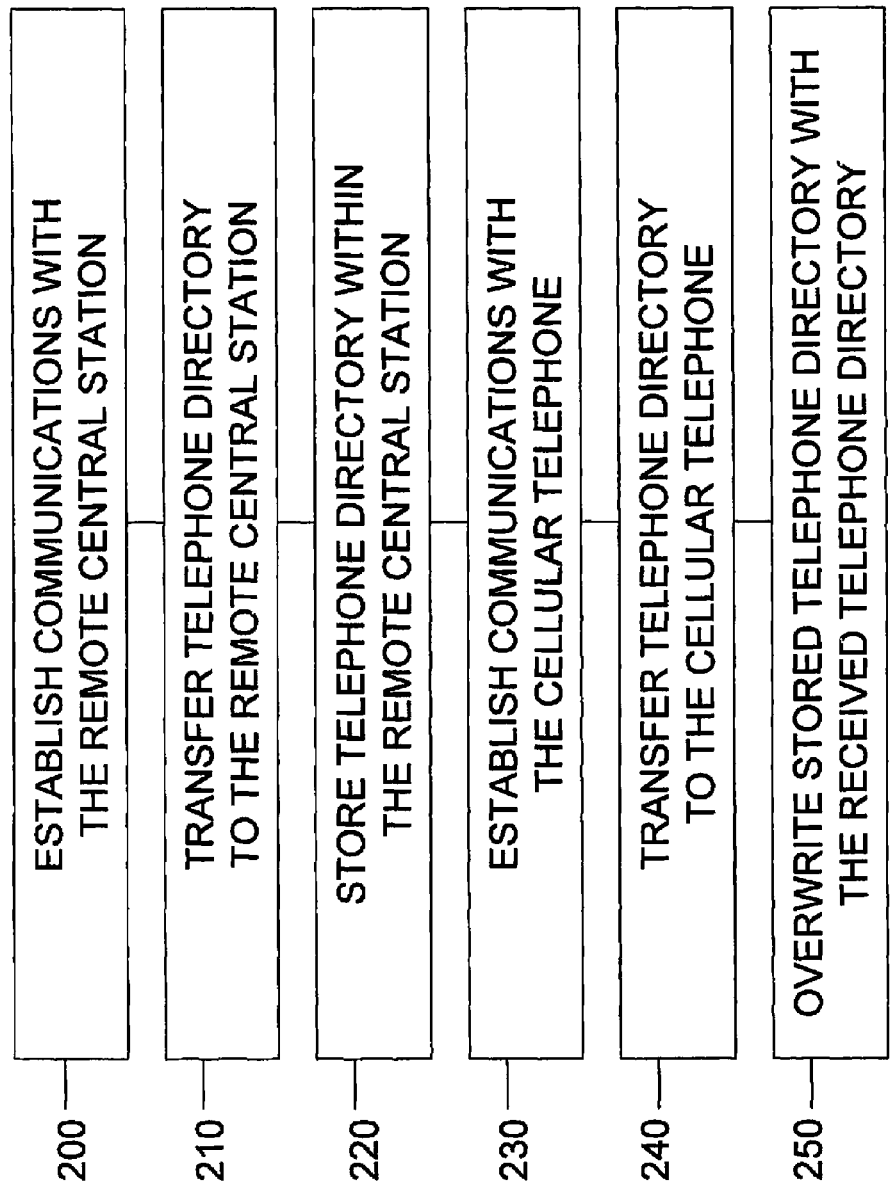
FIG. 2 is a flow chart illustrating an exemplary method for transferring a telephone directory or a portion thereof from a cellular telephone to the same cellular telephone or to at least another cellular telephone in accordance with the present invention.
Figure 3A:
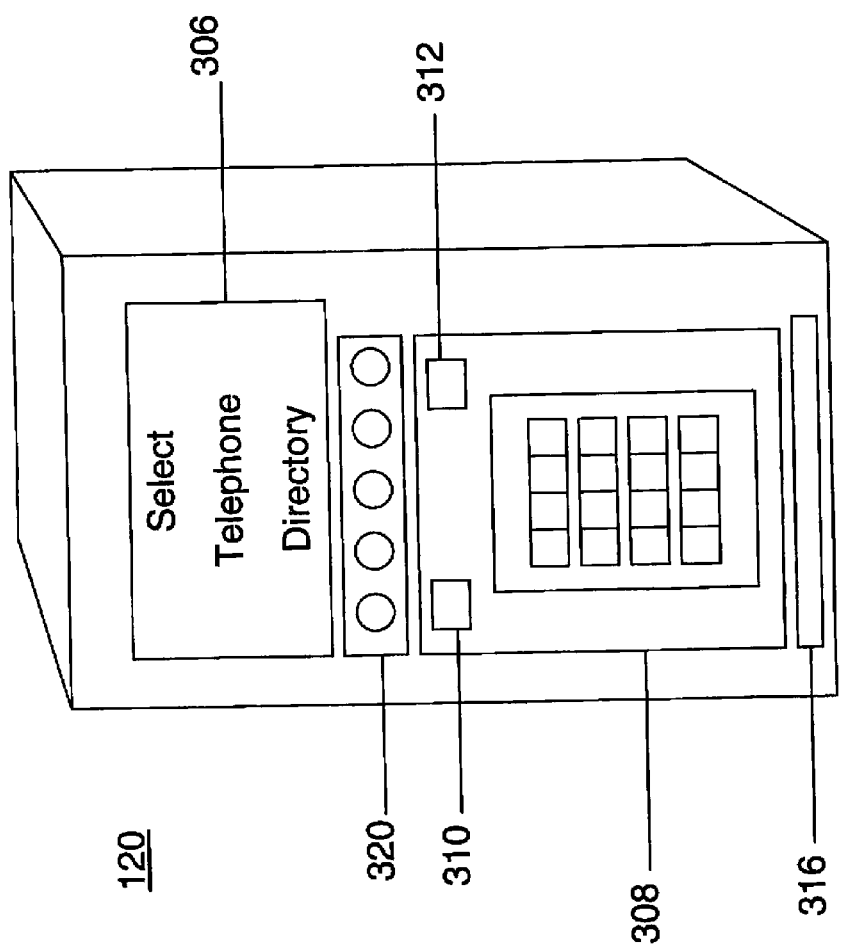
FIG. 3a illustrates a front view of a cellular telephone in accordance with the present invention.
Figure 3B:
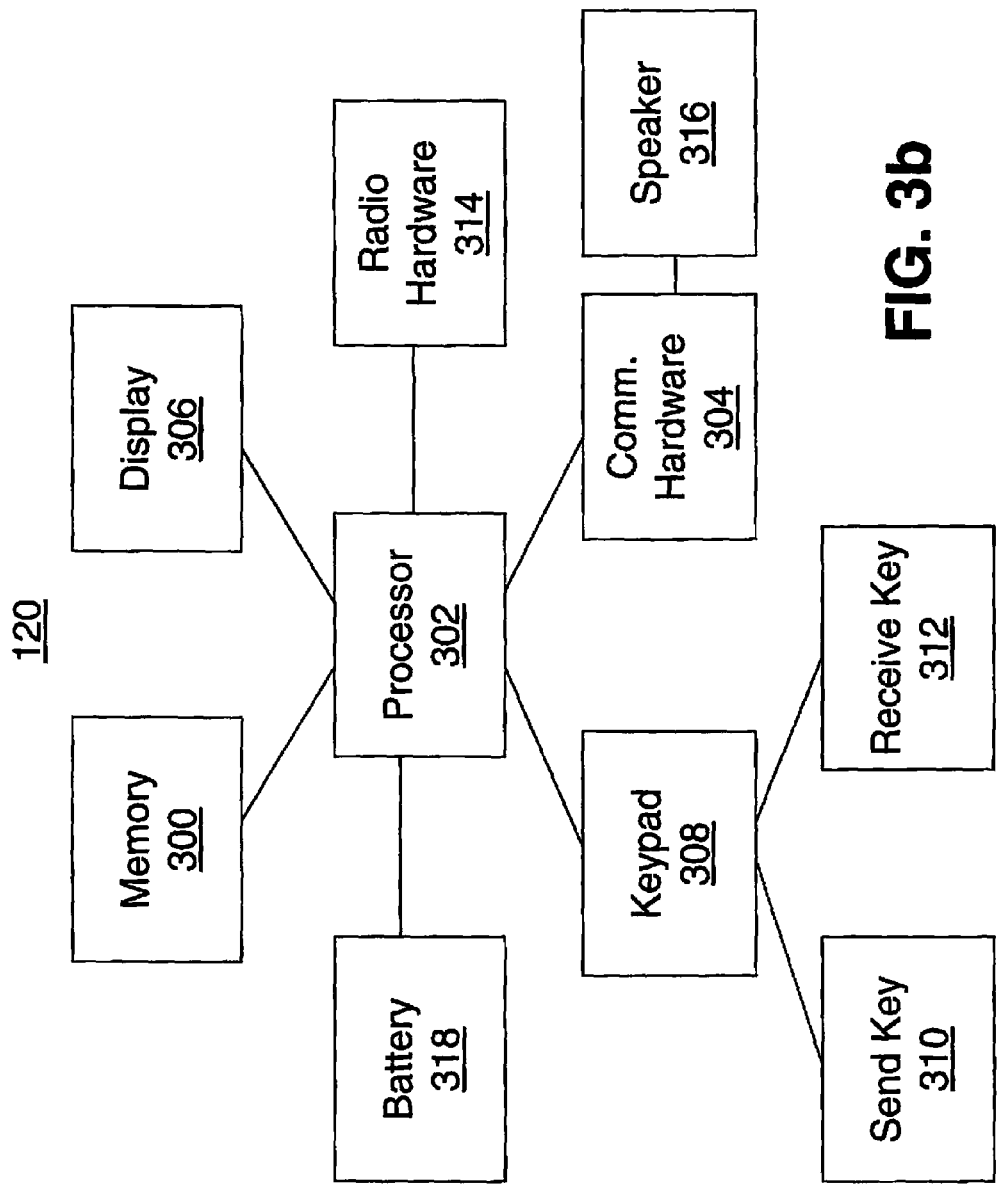

FIG. 1 illustrates a block diagram of an exemplary system for transferring a telephone directory or a portion thereof from a cellular telephone to the same cellular telephone or to at least another cellular telephone in accordance with the present invention. FIG. 2 illustrates a flow chart of an exemplary method of transferring the telephone directory or the portion thereof from the cellular telephone to the same cellular telephone or to at least another cellular telephone in accordance with the present invention. FIG. 3a illustrates a front view of a cellular telephone in accordance with the present invention. FIG. 3b illustrates a block diagram of the cellular telephone shown by FIG. 3a.

With reference to FIG. 1, the exemplary system in accordance with the present invention is designated generally by reference numeral 100 and includes a remote central station 110 for wirelessly or non-wirelessly establishing a communication link with a cellular telephone 120 for receiving a portion of or an entire telephone directory stored within a memory 300 (see FIG. 3b) of the cellular telephone 120. The memory 300 could be resident within a processor 302 or externally located from the processor 302 (as shown in FIG. 3b), e.g., the memory could be part of a removable or fixed SIMS card.

The communication link and other communication links referred to herein are preferably established via a cellular network, but can be established by one or more other networks, such as a paging network, a radio network, the Internet, a LAN, a WAN, an intranet, etc., and by one or more communication protocols, such as CDMA, TDMA, Bluetooth, IEEE 802.11, etc.

The remote central station 110 preferably includes at least one computing device capable of being accessed by the cellular telephone 120 by, e.g., transmitting a connection signal to the remote central station 110 or the dialing of a particular telephone number corresponding to the remote central station 110. The remote central station 110 can include, for example, a base station and/or a server. The remote central station 110 preferably includes a memory 130 for storing a plurality of telephone directories corresponding to a plurality of cellular telephones 120A-F. The memory 130 includes a data structure, such as a look-up table, for storing each telephone directory and mapping it to its corresponding cellular telephone 120.

Each cellular telephone 120 is represented in the data structure by a unique identification code or password which is created or pre-assigned by the remote central station 110 during a registration process. The registration process is initiated by the subscriber of the cellular telephone 120 after establishing a wireless or non-wireless communication link using his cellular telephone 120 with the remote central station 110 and the subscriber indicates his desire to register with the remote central station 110.

Information entered during the registration process includes the cellular telephone subscriber's identification information and payment information for use in effecting payment to an operator of the remote central station 110. The information can also contain contact information, such as the subscriber's e-mail address, mobile telephone number, facsimile telephone number, other telephone numbers, mailing address and employment information, e.g., name of employer and business address. The information entered during the registration process can subsequently be accessed and changed or appended by accessing the information via the user interface and changing or appending the information using the keypad 308 or other data entry device, such as a keyboard of a personal computer.

It is provided that the contact information is used by the remote central station 110 to send information to the subscriber, such as advertisements, announcements and promotions. For example, the remote central station 110 can periodically transmit e-mail announcements to the subscriber's e-mail address which is provided during the registration process. It is further provided that a third party, such as a corporation, provides this type of information (i.e., the information to be sent to the subscriber) to the remote central station 110 for sending to the subscriber. Further still, it is provided that the third party pays a fee to the operator of the remote central station 110 for providing this service.

It is further provided that the subscriber of the cellular telephone 120 creates the identification code or password, rather than the identification code or password being created by the remote central station 110. It is further provided for the subscriber to access a web site corresponding to the remote central station 110 via the Internet or other network for performing the registration process or other processes described herein.

The memory 130 of the remote central station 110 could store each telephone directory temporarily or permanently according to instructions received from the transmitting cellular telephone 120. If the storage is to be less than a predetermined period of time, e.g., one hour, the remote central station 110 stores the telephone directory in a temporary storage location of the memory 130, such as a buffer. If the storage is to be more than the predetermined period of time, the remote central station 110 preferably stores the telephone directory in a non-temporary storage location of the memory 130, such as a random access memory (RAM) module.

The remote central station 110 is configured for transferring the telephone directory or the portion thereof stored within its memory 130 to the cellular telephone 120 and overwrite the telephone directory (or a portion corresponding the portion thereof) stored within the cellular telephone. If only a portion of the telephone directory is transferred to the cellular telephone 120, it is provided that the same portion transmitted to the remote central station 110 or a different portion is transferred to the cellular telephone 120. The transfer process is initiated when a wireless communication link is established between the cellular telephone 120 and the remote central station 110.

It is contemplated that the telephone directory is transferred to the cellular telephone 120 automatically without receiving instructions, e.g., the telephone directory is transferred automatically after lapse of a pre-entered time period or the predetermined period of time. Preferably, in accordance with the present invention, the telephone directory is retained within the memory 130 of the remote central station 110 as a backup telephone directory after the telephone directory is transferred to the cellular telephone 120.

After the communication link is established, the cellular telephone 120 transmits instructions to the remote central station 110 via the communication link requesting the transfer of a telephone directory or a portion thereof stored within the memory 130 of the remote central station 110. The instructions preferably contain the identification code or password pre-assigned by the remote central station 110 to one of the telephone directories stored within the remote central station 110. Accordingly, the identification code or password enables the remote central station 110 to identify which telephone directory stored in the data structure is being requested by the transfer request. The telephone directory (or a portion thereof, as instructed by the subscriber and described below) is then transferred to the cellular telephone 120.

The instructions are entered by accessing a user interface of the remote central station 110 and displaying the user interface on a display 306 of the cellular telephone 120. The subscriber enters the instructions using a keypad 308 of the cellular telephone 120 and transmits the instructions to the remote central station 110.

The operation of the present invention is further described herein below with reference to FIG. 2. After the registration information is entered or after the subscriber establishes communications with the remote central station 110, the remote central station 110 communicates with the subscriber via the user interface to transmit the telephone directory or the portion thereof stored within the subscriber's cellular telephone 120 (step 200). In the case of transmitting the portion of the telephone directory, the subscriber selects which portion of the telephone directory to be transmitted by selecting the desired portion using the keypad 308. The subscriber then transmits the telephone directory or the portion thereof to the remote central station 110 (step 210) by pressing a SEND key 310 of the cellular telephone 120. The remote central station 110 receives the transmitted telephone directory or the portion thereof, stores the same within the memory 130 (step 220), and creates and assigns the identification code or password to the received data, i.e., the received telephone directory or portion thereof.

In case of transmitting the telephone directory from the remote central station 110 to the cellular telephone 120, after the registration information is entered or after the subscriber establishes the wireless communication link with the remote central station 110, the remote central station 110 communicates with the subscriber via the user interface. The subscriber then enters using the keypad 308 the identification code or password assigned to the desired telephone directory, i.e., the telephone directory the subscriber wants to be transmitted to the subscriber's cellular telephone 120. The subscriber then transmits via the communication link the identification code or password assigned to the desired telephone directory.

Using the received identification code or password, the remote central station 110 then accesses the desired telephone directory. It is provided that the desired telephone directory is displayed via the display 306 to the subscriber. While the telephone directory is displayed, the subscriber can select using the keypad 308 a particular portion of the telephone directory to be transmitted to his cellular telephone 120, in case the entire telephone directory is not desired. The subscriber then presses a RECEIVE key 312 of the cellular telephone 120 to transmit a signal to the remote central station 110 instructing the remote central station 110 to transmit the desired portion of or the entire telephone directory to the cellular telephone 120. The desired portion of or the entire telephone directory is then transmitted by the remote central station 110 to the subscriber's cellular telephone 120 (step 240). The telephone directory or a portion thereof which is stored within the cellular telephone 120 is then overwritten by the received telephone directory or a portion thereof (step 250).

The identification code or password besides being used to identify which telephone directory stored within the memory 130 is to be transferred to the cellular telephone 120, also acts as a security code to safeguard the telephone directory from being transferred to an unauthorized individual.

Anyone having the identification code or password can instruct the remote central station 110 to transfer the corresponding telephone directory to his cellular telephone 120. Accordingly, the telephone directory can be transferred from one to a plurality of cellular telephones, such as cellular telephones 120A-F.

The cellular telephones 120A-F may be assigned to or owned by a group of company employees. Therefore, each employee of the company can access the remote central station 110, transmit to the remote central station 110 the identification code or password assigned by the remote central station 110 to the company, and have the company's telephone directory pre-assigned the transmitted identification code or password transferred to his individual cellular telephone 120. This process is efficient and productive for a company, institution or other entity, since without the inventive process, each employee, member, etc. would have had to type the telephone directory corresponding to the entity using his cellular telephone in order to store the telephone directory within the telephone's memory. The inventive process can be performed in the time it typically takes to type-in one entry of a telephone directory.

A computing device 140, e.g., a personal computer, cellular telephone, or other computing device, of the entity can automatically, e.g., according to a programmed periodic basis, or manually transmit an updated telephone directory to the remote central station 110 to replace the telephone directory currently stored within the memory 130. The computing device 140, after establishing communications with the remote central station 110, transmits the identification code or password assigned to the company to the remote central station 110. Upon being recognized by the remote central station 110, the computing device 140 transmits to the remote central station 110 the updated telephone directory to replace or overwrite the telephone directory stored within the memory 130. The updated telephone directory is then stored within the memory 130. The updated telephone directory can also be transmitted to the remote central station 110 via a cellular telephone 120 in accordance with the present invention.

The updated telephone directory can then be either automatically or manually transmitted to the plurality of cellular telephones 120A-F which in this example correspond to individuals authorized to obtain the updated telephone directory, e.g., employees of a company. If the updated telephone directory is automatically transmitted, the remote central station 110 automatically broadcasts the updated telephone directory to at least a subset of the plurality of cellular telephones 120A-F for storage therein. Preferably, the remote central station receives instructions from one of the cellular telephones 120A-F, or another cellular telephone 120, before broadcasting the updated telephone director to at least the subset of the plurality of cellular telephones 120A-F.

It is provided that if any one of the plurality of cellular telephones 120A-F is turned off during an attempt by the remote central station 110 to establish communications for automatically transmitting the updated telephone directory, the remote central station 110 attempts to establish communications at a later time until a predetermined number of attempts are made.

If the updated telephone directory is to be manually transmitted, the remote central station 110 awaits a signal from a cellular telephone of the plurality of cellular telephones 120A-F belonging to the subset, before transmitting the updated telephone directory to the cellular telephone. The signal preferably includes the identification code or password corresponding to the updated telephone directory for identifying the updated telephone directory by the remote central station 110 and, as a security measure, for informing the remote central station 110 that the cellular telephone 120 transmitting the signal most likely belongs to the subset of the plurality of cellular telephones 120A-F. The same process is performed for all of the plurality of cellular telephones 120A-F belonging to the subset for receiving the updated telephone directory.

The remote central station 110 is programmable to transmit a message to each of the plurality of cellular telephones 120A-F belonging to the subset where the message indicates that an updated telephone directory is available for transmission from the remote central station 110 and storage within the plurality of cellular telephones 120A-F. It is contemplated that for the cellular telephones belonging to the subset which have not communicated with the remote central station 110 for receiving the updated telephone directory, the remote central station 110 is programmed to automatically transmit the updated telephone directory after a predetermined time period, e.g., five days, even if the identification code or password has not been transmitted to the remote central station 110.

It is further contemplated that the remote central station 110 can be instructed by users of the plurality of cellular telephones 120A-F via a network, such as the Internet, to transmit the updated telephone directory to a computing device, such as a personal computer or Personal Digital Assistant (PDA), via the network. The users can then elect to edit the updated telephone directory (e.g., delete telephone directory data corresponding to individuals the user of the cellular telephone would probably never need to call), before transferring the updated telephone directory from the computing device to their cellular telephones 120A-F, as disclosed in U.S. Pat. No. 5,930,703 issued to Cairns on Jul. 27, 1999 and assigned to Ericsson, Inc., the contents of which are incorporated herein by reference.

Further still, it is contemplated that each of the plurality of cellular telephones 120A-F belonging to the subset upon receiving the updated telephone directory append the stored telephone directory with the updated telephone directory and do not overwrite the stored telephone directory with the updated telephone directory.

The inventive cellular telephone 120 includes programming means for programming the cellular telephone 120 for communicating with the remote central station 110 and transmitting the telephone directory stored within the cellular telephone 120 to the remote central station 110 for backup on a periodic basis. The programming means is preferably a set of instructions (e.g., application software) stored within the memory 300 (FIG. 3b) and capable of being executed by the processor 302 of the cellular telephone 120 for enabling the subscriber to enter a specific time interval where after the lapse thereof, the cellular telephone 120 establishes the communication link with the remote central station 110 and transmits the telephone directory thereat via the communication link for storage. Once programmed, the cellular telephone 120 automatically establishes the communication link with the remote central station 110 every time an internal clock of the cellular telephone 120 clocks the specific time interval.

For example, the subscriber can program the cellular telephone 120 to establish the communication link with the remote central station 110 every seven days at 3:00 a.m. and transmit the telephone directory stored within the cellular telephone 120 to the remote central station 110. Accordingly, every seven days, i.e., the specific time interval, at 3:00 a.m. the cellular telephone 120 establishes the communication link with the remote central station 110 via communications hardware 304 and transmits to the remote central station 110 the telephone directory stored within the memory 300 of the cellular telephone 120 for storage within the remote central station 110.

It is provided that upon establishing the communication link with the remote central station 110, the cellular telephone 120 automatically transmits the identification code or password assigned to the subscriber via the communications hardware 304 to the remote central station 110. The identification code or password is used by the remote central station 110 for identifying the subscriber and the corresponding telephone directory stored within the remote central station 110. Upon receiving the transmitted telephone directory from the cellular telephone 120, the remote central station 110 overwrites the identified telephone directory with the received telephone directory.

It is provided that the remote central station 110 does not overwrite the identified telephone directory with the received telephone directory if the received telephone directory is substantially different than the identified telephone directory to prevent the identified telephone directory from being overwritten with a telephone directory whose integrity may have been compromised or affected. In this particular case, the remote central station 110 is programmed to send a message to the subscriber via the cellular telephone requesting authorization to overwrite the identified telephone directory with the received telephone directory. When the authorization is received from the subscriber, the remote central station 110 then overwrites the identified telephone directory with the received telephone directory. It is further provided that instead of requesting authorization, the remote central station 110 overwrites the identified telephone directory with the received telephone directory but stores the identified telephone directory for a predetermined amount of time in a backup file in case the identified telephone directory needs to be referenced to at a future time.

The inventive cellular telephone 120 can also be programmed via the programming means to communicate with the remote central station 110 on a periodic basis and receive the telephone directory stored within the remote central station 110 which corresponds to the cellular telephone 120 for updating or refreshing the telephone directory stored within the cellular telephone 120. The programming means enables the subscriber to enter a specific time interval where after the lapse thereof, the cellular telephone 120 establishes a wireless communication link with the remote central station 110 and receives the telephone directory stored thereat which corresponds to the cellular telephone 120. Once programmed, the cellular telephone 120 automatically establishes the wireless communication link with the remote central station 110 via the communications hardware 304 every time the internal clock of the cellular telephone 120 clocks the specific time interval.

For example, the subscriber can program the cellular telephone 120 to establish the wireless communication link with the remote central station 110 every fourteen days at 4:00 a.m. and receive the telephone directory stored within the remote central station 110 which corresponds to the cellular telephone 120. Accordingly, every fourteen days, i.e., the specific time interval, at 4:00 a.m. the cellular telephone 120 establishes the wireless communication link with the remote central station 110 via the communications hardware 304 and receives the telephone directory stored within the remote central station 110.

It is provided that upon establishing the communication link with the remote central station 110, the cellular telephone 120 automatically transmits the identification code or password assigned to the subscriber to the remote central station 110. The identification code or password is used by the remote central station 110 for identifying the subscriber and the corresponding telephone directory stored within the remote central station 110. The corresponding telephone directory is then transmitted to the cellular telephone 120 for storage therein. The cellular telephone 120 overwrites the previously stored telephone directory with the received telephone directory.

The inventive process also finds use in a networking setting where instead of exchanging business cards, a business associate or other individual can use his cellular telephone 120 to communicate with the remote central station 110 and have the telephone directory listing of another business associate or individual be transferred to his cellular telephone 120. For example, a first business associate provides a second business associate his identification code or password and the second business associate can then access the remote central station 110, transmit the identification code or password to the remote central station 110, and have the remote central station 110 transmit at least one telephone directory listing corresponding to the first business associate to the second business associate's cellular telephone 120. The telephone directory listing preferably includes at least the following information corresponding to the first business associate (or other individual): name, home telephone number, business telephone number, home address, business address, title, company or other affiliation, facsimile telephone number, pager number, mobile telephone number, e-mail address, and web-site address, e.g., a URL.

In accordance with another embodiment of the present invention, the inventive cellular telephone includes a Caller ID feature for identifying a calling party's telephone number and an entity the telephone number is assigned to, e.g., a business, a person, an organization, etc., and preferably displaying the information on the user interface. The cellular telephone then automatically or upon manual interaction transmits the displayed Caller ID information to the remote central station 110 where it is stored in the memory 130.

Prior to storing, the Caller ID information is preferably parsed or processed to obtain the telephone number and the entity the number is assigned to (i.e., create a telephone directory listing from the Caller ID information) and then the parsed data (i.e., created telephone directory listing) is stored in the memory 130 (if another telephone directory listing substantially matching or identical to the telephone directory listing is not already stored in the memory 300). The stored data or telephone directory listing indicative of the Caller ID information is matched or correlated via a data structure to the corresponding telephone directory. The data structure is preferably a pointer linking the memory address of the stored data to the memory address(es) of the telephone directory corresponding to the cellular telephone which transmitted the Caller ID information to the remote central station 110.

Once the Caller ID information is parsed and stored within the remote central station 110 as a telephone directory listing, the subscriber can access the telephone directory and add additional information to each telephone directory listing which was created from the Caller ID information, in a same manner as for the telephone directory listings which were not created from Caller ID information. The additional information can include the address of the entity, other telephone numbers corresponding to the entity, etc.

Instead of transmitting Caller ID information every time the subscriber receives a telephone call, the cellular telephone can be set to store all the Caller ID information obtained over a time period within the cellular telephone and then transmit all the Caller ID information after the time period lapses. Alternatively, it is contemplated that the cellular telephone parses and stores the Caller ID information as a telephone directory listing within its own telephone directory (if another telephone directory listing substantially matching or identical to the telephone directory listing is not already stored in the memory 300), whereby the telephone listings created from the Caller ID information, as well as all other telephone listings, are transmitted to the remote central station 110 when the telephone directory of the cellular telephone is transmitted to the remote central station 110. It is also contemplated for the cellular telephone 120 to only transmit one or selected ones of the telephone listings created from Caller ID information to the remote central station 110.

In accordance with the present invention, an individual, a company, or other entity, i.e., a payee, utilizing the remote central station 110, in order to store and transfer a telephone directory or a portion thereof from a cellular telephone to the same cellular telephone, to another cellular telephone, or to a plurality of cellular telephones, to pay a fee to at least one operator of the remote central station 110 for providing and/or performing the receiving, storing and transferring services. It is further provided for the remote central station 110 to periodically transmit via a network, such as the Internet, an invoice to the payee. The payee can then send payment via snail mail. The payee can also enter payment information, e.g., checking account information, on a payment form accessible via the invoice and transmit the payment information to the remote central station 110. The remote central station 110 can then use the payment information for effecting payment for the payee. Alternatively, the payee can provide authorization to the at least one operator to automatically, e.g., on a periodic basis, deduct funds from a payment account, such as an online payment account, corresponding to the payee and transfer the deducted funds to at least one payment account corresponding to the at least one operator.

Each cellular telephone 120 of the present invention preferably includes radio hardware 314 for operating as a cellular radiotelephone, i.e., having walkie-talkie features, as well as other radio-related features. It is contemplated that the telephone directory stored within the cellular telephone 120 or the remote central station 110 can be transmitted/received via a radio communication link between the cellular telephone 120 and the remote central station 110. Each cellular telephone 120 further includes a speaker 316 and a battery 318 for powering the cellular telephone 120. The battery 318 is preferably rechargeable for recharging the same via an electrical power source as known in the art.

Control buttons or keys 320 are also provided for controlling the cellular telephone 120, such as turning the cellular telephone 120 on and off, accessing the telephone directory stored within the memory 300, accessing voicemail, etc.

Each cellular telephone 120 of the present invention is programmed with a set of programmable instructions (e.g., application software) configured for being executed by the processor 302 of each cellular telephone 120 for performing the various functions, such as automatically or manually establishing the one or more wireless and non-wireless communication links with the remote central station 110 for transferring/receiving at least a portion of a telephone directory; transmitting the identification code or password to the remote central station 110; storing the received telephone directory; actuating the communications hardware 304; and transmitting/parsing the Caller ID information. The storing step may include appending a previously stored telephone directory.

The execution of the set of programmable instructions by the processor 302 further enables each cellular telephone 120 to instruct the remote central station 110 to identify and transfer at least a portion of one of a plurality of telephone directories stored within the memory 130 of the remote central station 110 to at least one of a plurality of cellular telephones 120A-F; to instruct the remote central station 110 to broadcast the telephone directory to a subset of a plurality of cellular telephones 120A-F; receiving a message transmitted from the remote central station 110 indicating that a telephone directory is available for transmission from the remote central station 110 to the cellular telephone 120 for storage within the memory 300 of the cellular telephone 120, and transmitting the signal to the remote central station 110, where the signal including at least an identification code identifying the telephone directory available for transmission; to instruct the remote central station 110 to transmit a stored telephone directory to the computing device via the network; instruct the remote central station 110 to store a transferred telephone directory within the memory 130 for a particular time period; to transmit information corresponding to the subscriber of the cellular telephone 120 to the remote central station 110 during the registration process; etc.

The remote central station 110 of the present invention is also programmed with a set of programmable instructions (e.g., application software) configured for being executed by at least one processor 160 for performing the various functions, such as establishing the one or more wireless and non-wireless communication links with the cellular telephone 120, communicating with the cellular telephone 120 for registering the subscriber and receiving the telephone directory or the portion thereof, assigning a identification code or password, storing the telephone directory, transmitting the telephone directory or the portion thereof to a particular cellular telephone 120 or to at least one of a plurality of cellular telephones 120 via the one or more communication links, receiving/parsing the Caller ID information to create at least one telephone directory listing, effecting payment for the payee, etc.

In conclusion, the present invention provides a cellular telephone 120 comprising a memory 300 storing a telephone directory; a processor 302 having access to the telephone directory stored in the memory 300; and a set of instructions capable of being executed by the processor 302 for performing the steps of: establishing a communication link with a remote central station 110; and transferring at least a portion of the telephone directory via the communication link to the remote central station 110. The processor 302 executes the set of instructions for performing the step of instructing the remote central station 110 to identify and transfer at least a portion of one of a plurality of telephone directories stored within a memory 130 of the remote central station 110 to at least one of a plurality of cellular telephones 120A-F. The step of instructing the remote central station 110 to identify and transfer occurs on a periodic basis.

Each of the plurality of telephone directories corresponds to a respective one of the plurality of cellular telephones 120A-F, and the plurality of cellular telephones 120A-F includes the cellular telephone 120. The communication link with the remote central station 110 is established on a periodic basis.

The processor 302 executes the set of instructions for performing the step of instructing the remote central station 110 to broadcast the telephone directory to a subset of a plurality of cellular telephones 120A-F. The processor 302 further executes the set of instructions for performing the steps of: receiving a message transmitted from the remote central station 110 indicating that a telephone directory is available for transmission from the remote central station 110 to the cellular telephone 120 for storage within the memory 300 of the cellular telephone 120; and transmitting a signal to the remote central station 110. The signal includes at least an identification code identifying the telephone directory available for transmission.

The processor 302 also executes the set of instructions for performing the step of instructing the remote central station 110 to transmit the transferred telephone directory to a computing device 140 via at least one network. Further, the processor 302 executes the set of instructions for performing the step of instructing the remote central station 110 to store the transferred telephone directory within the memory 130 for a particular time period. Further still, the processor 302 executes the set of instructions for performing the step of automatically transferring the stored telephone directory or a portion thereof to the cellular telephone 120 after lapse of the particular time period.

Additionally, the processor 302 executes the set of instructions for performing the step of transmitting an identification code to the remote central station 110 for identifying a telephone directory assigned the identification code and stored within the remote central station 110. Also, the processor 302 executes the set of instructions for performing the step of transmitting information corresponding to a subscriber of the cellular telephone 120 to the remote central station 110 during a registration process. The registration process includes the step of registering the subscriber with the remote central station 110.

Finally, the processor 302 executes the set of instructions for performing the steps of: identifying a calling party's telephone number and an entity the telephone number is assigned to, i.e., Caller ID information; and transmitting the Caller ID information to the remote central station 110 for storage as a telephone directory listing.

The present invention further provides a cellular telephone 120 comprising: a memory 300 storing a telephone directory; a processor 302 having access to the telephone directory stored in the memory 300; and a set of instructions capable of being executed by the processor 302 for performing the steps of: parsing Caller ID information, where the Caller ID information includes at least a telephone number and an entity assigned the telephone number; and storing the parsed Caller ID information as a telephone directory listing within the telephone directory. The processor 302 further executes the set of instructions for performing the step of transferring at least the stored telephone directory listing to a remote central station 110.

The present invention also provides a telephone directory management system 100 comprising: a remote central station 110 having a memory 130 for storing a plurality of telephone directories each assigned an individual identification code and at least one processor 160 having access to the plurality of telephone directories stored in the memory 130; and a plurality of cellular telephones 120A-F each storing a telephone directory and having a processor 302 for executing a set of instructions for performing the steps of: establishing a communication link with the remote central station 110; and transferring the respective telephone directories to the remote central station 110. The system 100 further includes a set of instructions capable of being executed by the at least one processor 160 for performing the steps of: identifying at least a portion of the telephone directory corresponding to at least one of the plurality of cellular telephones 120A-F and transferring the same to the at least one of the plurality of cellular telephones 120A-F. The establishing and transferring steps are performed on a periodic basis, and the identifying and transferring steps are performed on a periodic basis.

The processor 302 of at least one of the plurality of cellular telephones 120A-F executes the set of instructions for performing the step of instructing the remote central station 110 to broadcast a telephone directory stored within the memory 130 to the plurality of cellular telephones 120A-F. The processor 302 further executes the set of instructions for performing the steps of: receiving a message transmitted from the remote central station 110 indicating that a telephone directory is available for transmission; and transmitting a signal to the remote central station 110. The signal includes at least an identification code identifying the telephone directory available for transmission.

The processor 302 further executes the set of instructions for performing the steps of: identifying a calling party's telephone number and an entity the telephone number is assigned to, i.e., Caller ID information; and transmitting the Caller ID information to the remote central station 110 for storage as a telephone directory listing.

The present invention also provides a method for managing telephone directories corresponding to a plurality of cellular telephones 120A-F. The method comprises the steps of: storing a plurality of telephone directories each corresponding to a respective one of the plurality of cellular telephones 120A-F within a remote central station 110; processing instructions received by the remote central station 110 for identifying at least one telephone directory stored within the remote central station 110; and transferring the at least one identified telephone directory to at least one of the plurality of cellular telephones 120A-F. The plurality of cellular telephones 120A-F has the capability of transferring a respective telephone directory to the remote central station 110 for storage therein. The method further comprises the step of transmitting a message to the at least a subset of the plurality of cellular telephones 120A-F indicating that a telephone directory is available for transmission to at least the subset of the plurality of cellular telephones 120A-F for storage thereat.

The method further comprises the step of automatically transferring the at least one telephone directory to at least a subset of the plurality of cellular telephones 120A-F. The method also comprises the steps of: receiving Caller ID information, i.e., a calling party's telephone number and an entity the telephone number is assigned to; processing the received Caller ID information to create at least one telephone directory listing; and storing the at least one telephone directory listing within the remote central station 110.

Additionally, the method comprises the steps of: receiving data from a third party for transmitting to at least one subscriber of the plurality of cellular telephones 120A-F; and sending the received data to the at least one subscriber of the plurality of cellular telephones 120A-F. The method also comprises the steps of charging a fee to the third party for performing at least the step of sending the received data, and charging a fee to at least one subscriber of the plurality of cellular telephones 120A-F.

Although the illustrative embodiments of the present invention have been described herein with reference to the accompanying drawings, it is to be understood that the invention is not limited to those precise embodiments, and that various other changes and modifications may be affected therein by one having ordinary skill in the art without departing from the scope of spirit of the invention. Accordingly, various modifications and variations can be made without departing from the spirit or scope of the invention as set forth in the following claims both literally and in equivalents recognized in law.

The invention claimed is:

1. A cellular telephone comprising:
    a memory storing a telephone directory;
    a processor having access to the telephone directory stored in the memory; and
    a set of instructions capable of being executed by the processor for performing the steps of:
        establishing a communication link with a remote central station;
        transferring, after user selection of a dedicated key of the cellular telephone, at least a portion of the telephone directory via the communication link to the remote central station; and
        receiving advertisements from the remote central station.

2. A cellular telephone comprising:
    a memory storing a telephone directory;
    a processor having access to the telephone directory stored in the memory; and
    a set of instructions capable of being executed by the processor for performing the steps of:
        establishing a communication link with a remote central station;
        transmitting, after user selection of a dedicated key of the cellular telephone, an instruction to the remote central station to transmit data stored at the remote central station to the cellular telephone; and
        receiving advertisements from the remote central station.

3. The cellular telephone according to claim 2, wherein the data stored at the remote central station includes a telephone directory.

* * * * *